US008662234B2

(12) United States Patent
Roeder

(10) Patent No.: US 8,662,234 B2
(45) Date of Patent: Mar. 4, 2014

(54) DRIVE AND STEERING APPARATUS FOR AN INDUSTRIAL TRUCK

(75) Inventor: Matthias Roeder, Hamburg (DE)

(73) Assignee: Jungheinrich Akteingesellschaft, Hamburg (DE)

( * ) Notice: Subject to any disclaimer, the term of this patent is extended or adjusted under 35 U.S.C. 154(b) by 587 days.

(21) Appl. No.: 12/872,593

(22) Filed: Aug. 31, 2010

(65) Prior Publication Data

US 2011/0048834 A1 Mar. 3, 2011

(30) Foreign Application Priority Data

Sep. 1, 2009 (DE) .......................... 10 2009 040 043

(51) Int. Cl.
*B60K 17/30* (2006.01)
*B62D 3/02* (2006.01)

(52) U.S. Cl.
USPC ............................ 180/252; 180/6.44; 180/6.2

(58) Field of Classification Search
USPC ............... 180/6.44, 6.2, 6.28, 6.38, 6.48, 6.5, 180/253, 255, 252, 65.6; 701/1
See application file for complete search history.

(56) References Cited

U.S. PATENT DOCUMENTS

2007/0095594 A1* 5/2007 Prehn ............................ 180/254
2007/0260370 A1* 11/2007 Romig ............................ 701/23

FOREIGN PATENT DOCUMENTS

DE    10 2006 033 958 A1    1/2008
EP         1 772 348 A2    9/2006

* cited by examiner

*Primary Examiner* — Tony Winner
*Assistant Examiner* — Jacob Knutson
(74) *Attorney, Agent, or Firm* — Vidas, Arrett & Steinkraus

(57) ABSTRACT

A drive and steering apparatus for an industrial truck with a drive wheel, which is rotatably suspended in a drive wheel suspension, which is swivel-mounted around a mainly vertical axis, a steering device, which has a handlebar and a bearing component, which is swivel-mounted coaxially or axially parallel to the drive wheel suspension, and a steering wheel control device, which has at least one sensor, which is permanently arranged with respect to the drive wheel suspension or the bearing component and captures a differential angle between the drive wheel suspension and the bearing component, and a steering drive, with which the drive wheel suspension is pivotable as required by the measured differential angle, characterized by a sensor arm, which is connected in a torque-proof manner with a sensor shaft of the at least one sensor, and a counter piece, which is permanently arranged with respect to the bearing component or respectively of the drive wheel suspension and works together with the sensor arm such that the sensor aim with the sensor shaft is rotated during a relative movement between the bearing component and the drive wheel suspension.

15 Claims, 4 Drawing Sheets

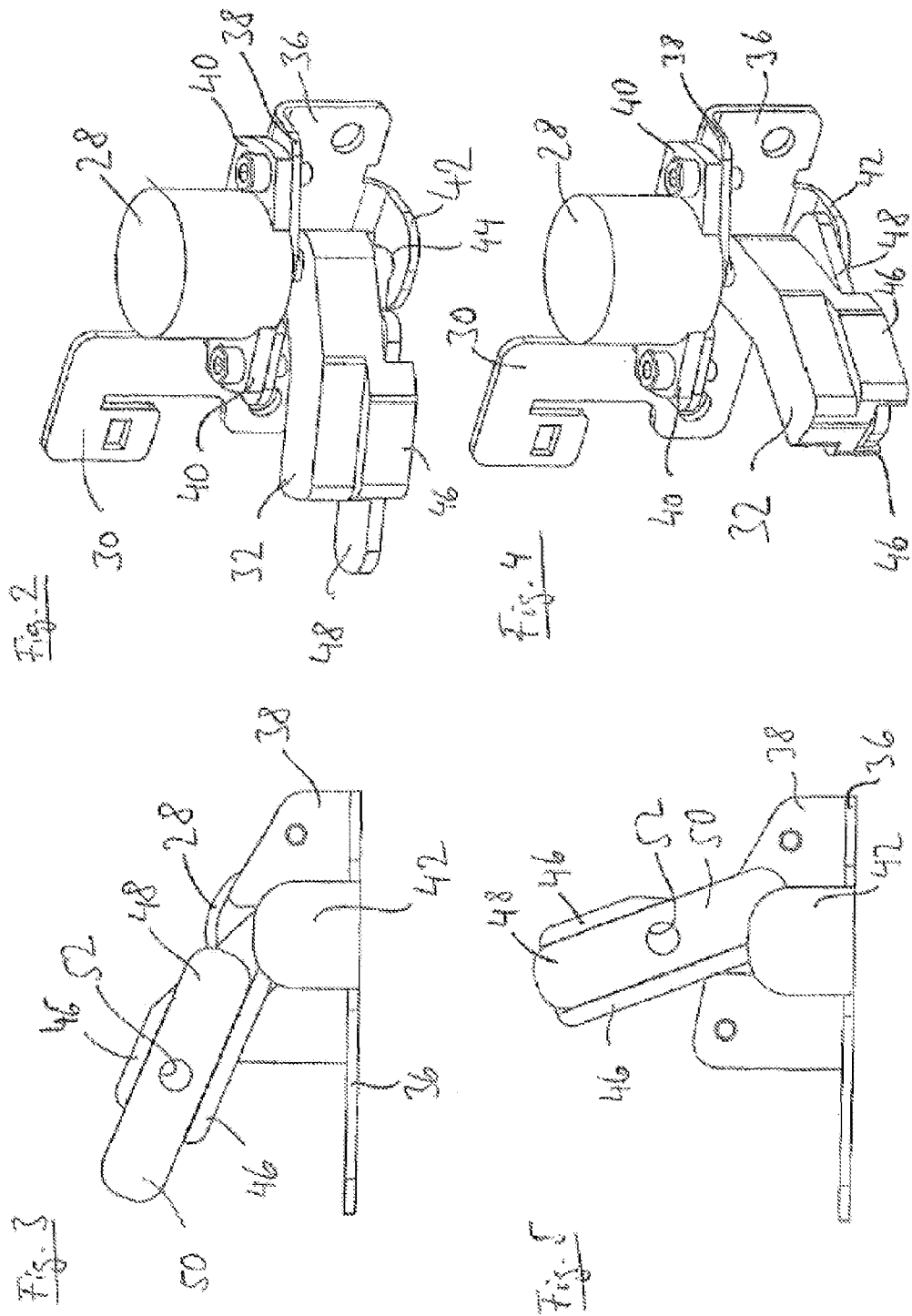

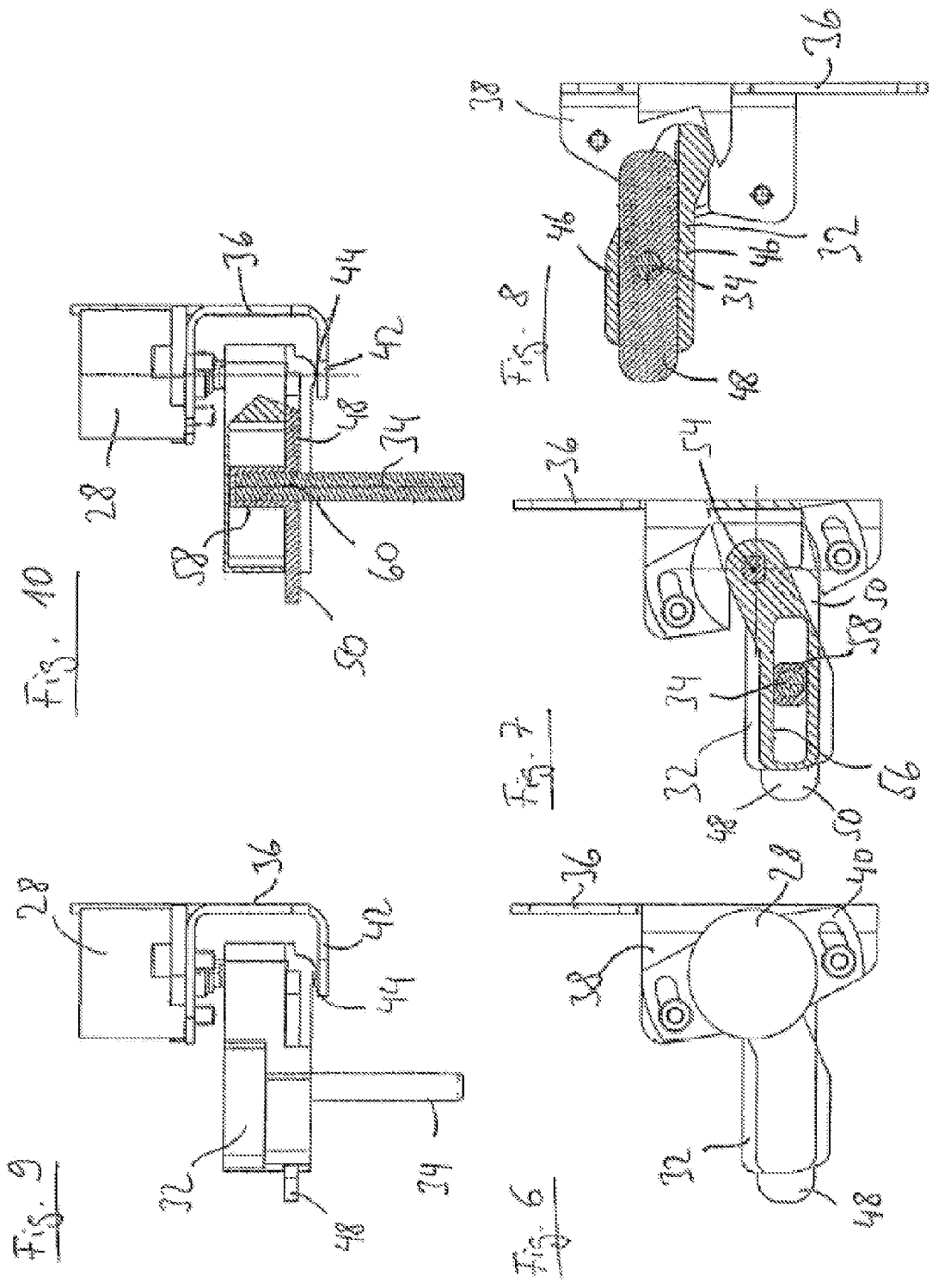

Figure 1:
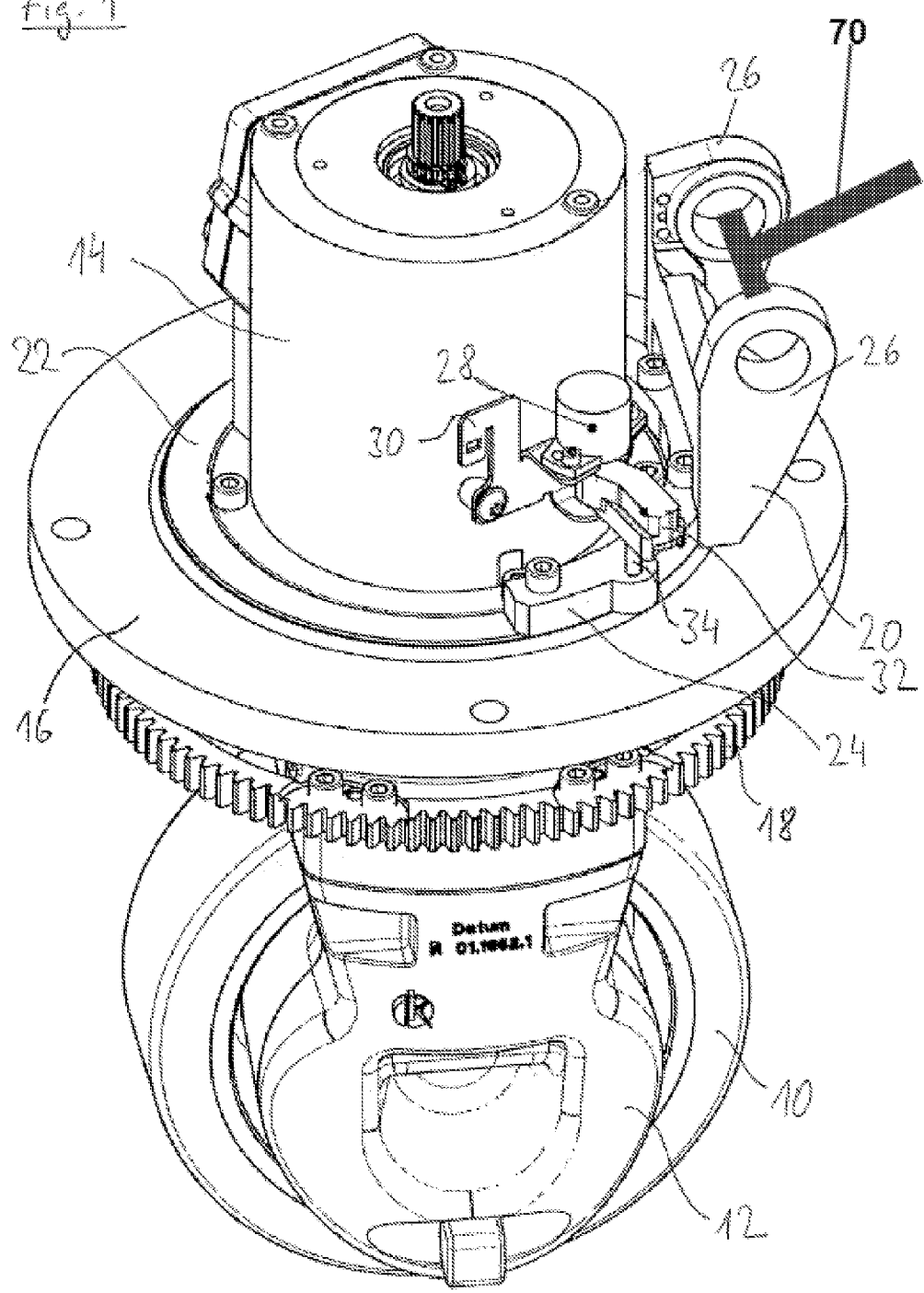

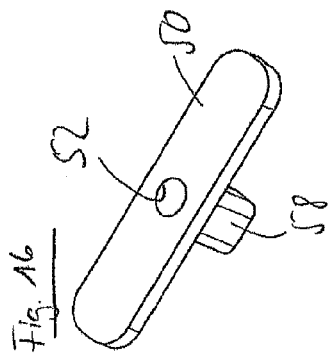
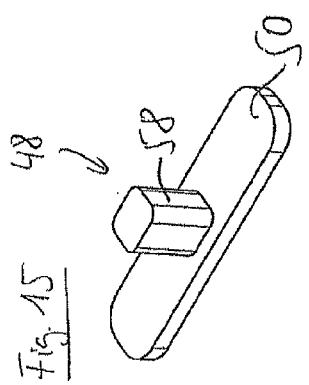
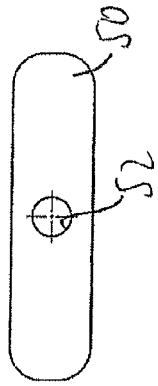
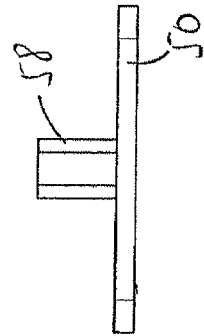
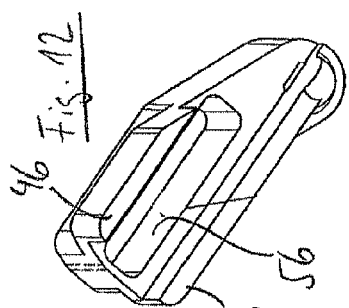
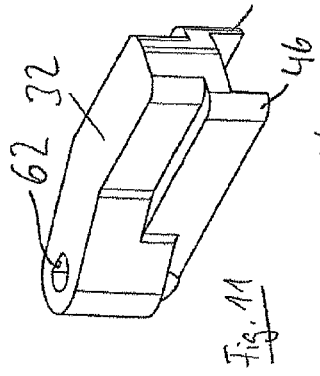
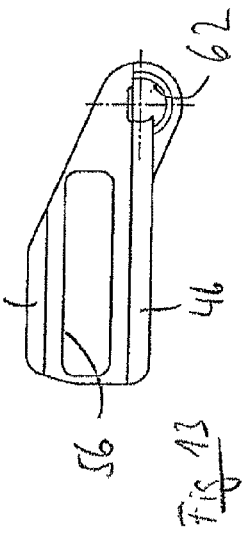
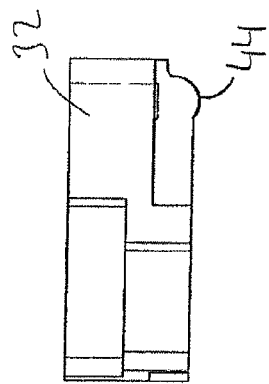

DRIVE AND STEERING APPARATUS FOR AN INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a drive and steering apparatus for an industrial truck with a drive wheel, which is rotatably suspended in a drive wheel suspension, which is swivel-mounted around a vertical axis, a steering device, which has a handlebar and a bearing component, which is swivel-mounted coaxially or axially parallel to the drive wheel suspension, and of a steering angle device, which has a sensor, which captures a differential angle between the drive wheel suspension and the bearing component, and a steering drive, with which the drive wheel suspension is pivotable as required by the measured differential angle.

Such a drive and steering apparatus is known from European patent EP 1 772 348 B1, the entire contents of which is incorporated herein by reference. The case of the known apparatus, the sensor has a pinion gear and is swivel-mounted on an arm pretensioned by a spring on the bearing component. The spring pretensions the sensor with the pinion gear in the direction of a ring gear permanently arranged with respect to the drive wheel suspension. The pinion gear is rotated during a relative movement between the bearing component and the drive wheel suspension through the engagement between this ring gear and the pinion gear. The control device tracks the movement of the drive wheel suspension of a movement of the bearing component such that the differential angle assumes a zero value.

Assuming this, it is the object of the invention to provide a drive and steering apparatus for an industrial truck of the initially named type, which is constructed in a simpler and more compact manner, is easier to install and is more robust and insensitive to wear and dirt.

BRIEF SUMMARY OF THE INVENTION

The drive and steering apparatus for an industrial according to the invention has:
 a drive wheel, which is rotatably suspended in a drive wheel suspension, which is swivel-mounted around a mainly vertical axis,
 a steering device, which has a handlebar and a bearing component, which is swivel-mounted coaxially or axially parallel to the drive wheel suspension, and
 a steering wheel control device, which has at least one sensor, which is permanently arranged with respect to the drive wheel suspension or the bearing component and captures a differential angle between the drive wheel suspension and the bearing component, and a steering drive, with which the drive wheel suspension is pivotable as required by the measured differential angle, and
a sensor arm, which is connected in a torque-proof manner with a sensor shaft of the at least one sensor, as well as
a counter piece, which is permanently arranged with respect to the bearing component or respectively of the drive wheel suspension and works together with the sensor arm such that the sensor arm with the sensor shaft is rotated during a relative movement between the bearing component and the drive wheel suspension.

The drive wheel and the drive wheel suspension can be parts of a drive unit, which additionally has a drive motor and/or a gearbox. Then the entire drive unit can be swivel-mounted around the mainly vertical axis. Around a mainly vertical axis means that the drive wheel suspension can execute a steering movement with the drive wheel. In the case of a wheel camber, the vertical axis does not need to be aligned completely vertically for this; a slight inclination with respect to the vertical is also possible. The drive wheel is rotatably suspended in the drive wheel suspension around a horizontal axis. The drive wheel suspension can for example be a turntable, with one or two downward extending legs on which or between which the drive wheel is arranged.

In the case of a drawbar-driven industrial truck, the steering device can have a drawbar as the handlebar and a bearing block as the bearing component, which is connected with the drawbar, wherein the drawbar is pivotable around a horizontally arranged axis and has a drawbar foot and a drawbar head. However, the handlebar can also be another handlebar to be operated by hand and/or if applicable act on the pivotable bearing component via a gearbox, for instance a chain or a tooth belt. In particular, the handlebar does not need to be swivel-mounted around the same axis as the bearing component.

The at least one sensor can be fastened directly or indirectly, for example via another element like a housing of a drive motor and/or via a holder, on the drive wheel suspension or on the bearing component. That the sensor measures a differential angle between the drive wheel suspension and the bearing component means that this differential angle can be determined using a value output by the sensor. The rotation angle of the sensor shaft does thereby not need to match the differential angle to be measured. The steering drive has an in particular electrical steering motor and can act on the drive wheel suspension via a gearbox, for example a tooth belt/chain arrangement. The rotation of the drive wheel suspension executed by the steering drive takes place as required by the measured differential angle. In particular, the steering angle control device can be designed such that the differential angle can be regulated to zero or another predetermined reference value.

The sensor arm is connected in a torque-proof manner with the sensor shaft and extends from it at least partially in the radial direction.

When the sensor is permanently arranged with respect to the drive wheel suspension, the counter piece is permanently arranged with respect to the bearing component. When the sensor is permanently arranged with respect to the bearing component, the counter piece is permanently arranged with respect to the drive wheel suspension. The counter piece works mechanically with the sensor arm so that the sensor arm is deflected from the counter piece in the case of a relative movement between the bearing component and the drive wheel suspension and the sensor shaft is rotated accordingly. The relative movement or more exactly the differential angle between the drive wheel suspension and the bearing component can thus be measured with the help of the rotation of the sensor shaft.

A constructively particularly simple structure, which enables in particular a permanent arrangement of the sensor and the counter piece on the drive wheel suspension or respectively the bearing component, was found through the interaction of the sensor arm with the counter piece. An expansive, constructively complicated and hard to install arrangement of the sensor on a pivotable, spring-pretensioned arm is not required. With respect to the ring gear/pinion gear arrangement from the state of the art, the combination of the sensor arm and the counter piece is less prone to being dirty. In particular, dirt does not inevitably lead to an increased play and thus inaccuracies in the capturing of the differential angle as with the combination of the ring gear and pinion gear. Thus, the differential angle can also be measured more exactly under actual conditions.

In one embodiment, the counter piece and sensor arm have guide means, which prevent a displacement of the counter piece with respect to the sensor arm in the tangential direction with respect to the sensor shaft. The background of this embodiment is that the relative movement between the drive wheel suspension and the bearing component goes along with a relative movement between the counter piece and the sensor, during which the distance between the sensor shaft and the counter piece changes, for example in a longitudinal direction of the sensor arm. It is ensured by the guide means that this relative movement between the counter piece and the sensor arm does not lead to a movement in the sensor arm in the tangential direction with respect to the sensor shaft, that is in a direction impacting the measurement value output by the sensor. The guide means can for example be a groove in the sensor arm and pin on the counter piece, which is guided in the groove, or vice versa. Another option is a clamp or casing on the counter piece, which encompasses a bar of the sensor arm or the entire sensor aim, or vice versa. In this connection, "or vice versa" means that the roles of the counter piece and sensor arm are swapped and the named elements can be designed on the respective other one of these parts.

In accordance with one embodiment, the sensor arm and the counter piece each have at least one gliding surface, wherein the at least one gliding surface of the sensor aim is in surface-to-surface contact with the at least one gliding surface of the counter piece. The sensor arm and the counter piece can also generally work together mechanically by means of a point- or line-shaped contact area. However, surface-to-surface contact is less subject to wear and tear and thus permanently offers greater accuracy.

In one embodiment, the guide means has a driving pin and a gate, wherein the driving pin in the gate is forcibly guided on both sides. The gate has a slit or a groove, in which the driving pin is guided. The groove or the slit can be straight or bent. The gate and the driving pin ensure a secure and low-play interaction between the counter piece and the sensor arm.

In accordance with one embodiment, the driving pin is rotatably mounted in a glide piece. The glide piece glides forcibly on both sides in the gate, wherein surface-to-surface contact is preferably provided between the glide piece and the gate with the help of two cooperative gliding surfaces. This arrangement has little tendency to wear and simultaneously enables the required rotational movement between the counter piece and the sensor arm.

In accordance with one embodiment, the gate has a groove that is closed on one side, into which the driving pin and/or the gliding piece engages on the open side. The opened side can in particular be directed downward. This arrangement counteracts contamination of the groove.

In accordance with one embodiment, the gliding piece has an extension, which is arranged orthogonally to the driving pin and covers an opening in the gate, into which the driving pin and/or the gliding piece engages. The extension can be in particular disk-like or plate-like. The opening in the gate can be in particular the groove or the slit of the gate. Through the covering of the extension of the gliding piece, the groove or the slit and thus the guide surfaces of the gate are further protected from dirt. The extension can be measured in particular in a longitudinal direction of the gate such that the opening with respect to the gate is covered in the case of all arrangements of the gliding piece occurring in operation.

In accordance with one embodiment, the extension is enclosed laterally by bars on the guide means having the gate. In particular, two bars arranged mainly in the direction of the relative movement between the gliding piece and the gate can be present. A slit leading to the opening of the gate between the gliding piece and the guide means having the gate is covered by the bars so that the penetration of dirt is prevented particularly effectively.

In accordance with one embodiment, the counter piece is shiftable with respect to the sensor arm along a straight line, which runs at a lateral distance from the sensor shaft. In the case of a shift in the counter piece with respect to the sensor arm, in particular in a longitudinal direction of the sensor arm, the counter piece or a part of the counter piece, in particular an extension beyond the contact area between the counter piece and the sensor arm, can laterally bypass the sensor shaft. The counter piece can thereby be arranged close to the sensor shaft, which enables a particularly compact structure.

In one embodiment, the sensor arm is slid onto the sensor shaft and is safeguarded from slipping off the sensor shaft by a boundary surface permanently arranged with respect to the sensor. The sensor arm can generally be fastened in a torque-proof manner on the sensor shaft in any manner, for example with the help of a set screw. However, the sliding of the sensor arm onto the sensor shaft is particularly easy. The torsional strength of the connection can be achieved through a non-rotation-symmetrical cross-section of the sensor shaft and the complementary opening in the sensor arm. The permanently arranged boundary surface can be formed for example by a flap, which is designed as one piece with a holder of the sensor. The sensor aim can then be slid onto the sensor shaft during installation and the sensor can subsequently be fastened on the sensor holder. This installation is particularly simple and prevents in a maintenance-free manner an undesired release of the sensor arm from the sensor shaft.

In accordance with one embodiment, the sensor arm has a contact surface on its rotational axis, which rests against the boundary surface. The contact surface can be formed for example from a rounded projection on the sensor arm so that a mainly punctiform contact area is achieved between the sensor arm and the boundary surface, which is also located on the rotational axis. Frictional forces in the contact area can thereby be minimized, wherein the ease of mobility of the entire arrangement advantageously impacts the longevity and accuracy.

In accordance with one embodiment, the potential differential angle between the drive wheel suspension and the bearing component is restricted by at least one stop such that a maximum permissible movement of the counter piece with respect to the sensor is not exceeded. The maximum permissible movement of the counter piece with respect to the sensor is thereby determined by the arrangement made up of the sensor arm and the counter piece. Through the at least one stop, it is effectively prevented that the arrangement made up of the sensor arm and the counter piece or respectively the sensor itself is damaged by the exceedance of a maximum differential angle, for example as the result of a defect in the steering angle control device. Moreover, the at least one stop ensures that the industrial truck is also possible in the case of such a defect through the manual adjustment of the steering angle with the handlebar.

The aforementioned object is also solved through the drive and steering apparatus for an industrial truck with the characteristics of claim 13. Advantageous embodiments are specified in the subsequent dependent claims.

The drive and steering apparatus for an industrial truck according to claim 13 has
- a drive wheel, which is rotatably suspended in a drive wheel suspension, which is swivel-mounted around a mainly vertical axis,
- a steering device, which has a handlebar and a bearing component, which is swivel-mounted coaxially or axially parallel to the drive wheel suspension, and
- a steering wheel control device, which has at least one sensor, which measures a differential angle between the drive wheel suspension and the bearing component, and has a steering drive, with which the drive wheel suspension is pivotable as required by the measured differential angle, wherein
- the at least one sensor is permanently arranged with respect to the drive wheel suspension.

The above embodiments are referenced with respect to the explanation of the characteristics of this drive and steering apparatus. The sensor can be directly or indirectly attached to the drive wheel suspension, for example on a motor or gearbox housing, which is connected with the drive wheel suspension.

This arrangement of the sensor on the drive wheel suspension enables a particularly compact structure because the sensor is located close to the vertical pivot axis of the drive wheel suspension whereby the free space for the sensor required in the case of a pivoting of the drive wheel suspension around the vertical axis is reduced. Moreover, a connection cable of the sensor, which is normally guided together with other cables for a drive motor from the pivotable drive unit to a permanent-frame control, can be permanently arranged because no relative movement takes place between the sensor and the drive wheel suspension with the other cables.

In accordance with one embodiment, the sensor measures the differential angle without contact. For example, an optical or an inductive sensor can be used, which works together with an optical mark or a magnet arrangement on the bearing component.

In accordance with one embodiment, the drive and steering apparatus has a sensor arm, which is connected in a torque-proof manner with a sensor shaft of the sensor, and a counter piece, which is permanently arranged with respect to the bearing component and works together with the sensor arm such that the sensor arm with the sensor shaft is rotated between the bearing component and the drive wheel suspension in the case of a relative movement. The whole arrangement is preferably designed according to one of claims 2 through 12. The above embodiments are referenced with respect to the explanation of these characteristics.

DETAILED DESCRIPTION OF FIGURES OF THE DRAWINGS

The invention is explained in greater detail below based on an exemplary embodiment shown in figures. They show in:

FIG. 1 a drive and steering apparatus in a perspective view,

FIG. 2 the sensor of the apparatus from FIG. 1 with holder, sensor arm and gliding piece in a perspective view, FIG. 3 a view of the arrangement from FIG. 2 from below, FIG. 4 the arrangement from FIG. 2 in the case of another position of the sensor arm in a perspective view, FIG. 5 the arrangement from FIG. 4 in a view from below, FIG. 6 the arrangement from FIG. 2 in the case of another position of the sensor arm in a view from above, FIG. 7 the arrangement in FIG. 6 in a partially cut representation from above, FIG. 8 the arrangement in FIGS. 6 and 7 in a partially cut representation from above, FIG. 9 the arrangement in FIG. 6 in a view from the side, FIG. 10 the arrangement in FIG. 6 from the side in a partially cut representation, FIG. 11 the sensor arm of the drive and steering apparatus in FIG. 1 in a perspective view diagonally from above, FIG. 12 the sensor arm from FIG. 11 in a perspective view diagonally from below, FIG. 13 the sensor atm from FIG. 11 in a view from below, FIG. 14 the sensor arm from FIG. 11 in a view from the side, FIG. 15 the gliding piece of the drive and steering apparatus in FIG. 1 in a perspective view diagonally from above, FIG. 16 the gliding piece in FIG. 15 in a perspective view diagonally from below, FIG. 17 the gliding piece in FIG. 15 in a view from below, FIG. 18 the gliding piece in FIG. 15 in a view from the side,

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows the drive and steering apparatus for a drawbar-driven industrial truck. The drive and steering apparatus has a drive wheel 10, which is swivel-mounted in a drive wheel suspension 12 around a horizontal axis. The drive wheel suspension 12 has a leg arranged on the side of the drive wheel 10, in which a gearbox can be arranged. The drive wheel suspension 12 and the drive wheel 10 are part of a drive unit, which comprises a drive motor 14. The entire drive unit is swivel-mounted around a vertical axis in a drive bearing, the bearing outer ring 16 of which is permanently connectable with a frame (not shown) of the industrial truck.

A tooth wheel 18, which works together with a steering drive (not shown), is permanently connected with the drive wheel suspension 12 in order to rotate the entire drive unit around the vertical axis for the purpose of executing a steering movement.

A bearing component pivotable around the same vertical axis as the drive unit is formed by a drawbar block 20, which is permanently connected with a ring 22 of an additional bearing. The ring 22 and the drawbar block 20 can be pivoted independently of the drive unit in a frame (not shown) of the industrial truck. The drawbar block 20 has a subring-shaped fastening section 24 partially following the progression of the ring 22, which is screwed with the ring 22, and two vertically arranged, parallel legs 26, between which a drawbar 70 (shown schematically) can be swivel-mounted around a horizontal axis.

A sensor 28 is fastened on a housing of the drive motor 14 with a holder 30, which is in turn permanently connected with the drive wheel suspension 12. Thus, the sensor 28 is arranged in a permanent position with respect to the drive wheel suspension 12 and is fastened indirectly on the drive wheel suspension 12. A sensor arm 32 is connected in a torque-proof manner with a sensor shaft that cannot be seen in FIG. 1. The sensor arm 32 works together with a driving pin 34, which is fastened on the fastening section 24 of the drawbar block. The driving pin 34 is arranged circular-cylindrically and vertically. Further details of the drive and steering apparatus are easier to see in the detailed drawings, in which the same reference numbers are used as in FIG. 1.

FIG. 2 shows in particular the shape of the holder 30, which is produced from a piece of sheet metal. The holder has a vertically arranged, smooth plate 36, which is screwed with two fastening screws on the housing of the drive motor 14. An angled fastening section 38, which has two threaded bore holes and is screwed with two fastening flanges 40 of the sensor 28, is connected to an upper edge of the vertical plate 36. A flap 42, which extends from a lower edge of the vertical plate 36 in the same direction as the fastening section 38, is designed on the holder parallel and at a distance from the fastening section 38 for the sensor 28. A sensor shaft of the sensor 28 not visible in FIG. 2 extends from sensor 28 downward and is arranged mainly between the fastening section 38 and the flap 42 of the holder. The sensor arm 32 is mounted on this sensor shaft from below and has an approximately spherical-segment-shaped contact surface 44 on the bottom, which lies against the top side of the flap 42.

As can best be seen in FIG. 3, the sensor arm 32 has on its bottom side two bars 46 running parallel to each other in a longitudinal direction of the sensor 32, between which a gliding piece 48 is arranged. The gliding piece 48 has an extension 50, which has the shape of an elongated rectangular disk with rounded corners. A bore hole 52, in which the driving pin 34 engages, is located in the middle of the disk-shaped extension 50.

The sensor arm 32 extends outward mainly in the radial direction with respect to the sensor shaft, wherein it has an asymmetrical shape. The gliding piece 48 is located in the position of the sensor arm 32 shown in FIGS. 2 and 3 with its bore hole 52 relatively close to the free end of the sensor arm 32 facing away from the sensor shaft. In this position, the section of the disk-shaped extension 50 facing the sensor shaft covers an opening designed in the sensor arm 32, which however cannot be seen in FIG. 3, since it is located behind the extension 48. In FIGS. 2 and 3, the sensor arm 32 is arranged at a sharp angle to the vertical plate 36 of the holder 32, which corresponds with a relatively strong displacement of the sensor arm 32 from a central position.

FIG. 4 shows the arrangement of the FIGS. 2 and 3 in a different position of the sensor 32, which now extends almost at a right angle to the vertical plate 36 of the holder and is located in a central position. As can be seen in particular in FIG. 5, in this position of the sensor arm 32, the gliding piece 48 is arranged such that a section of the disk-shaped extension 50 facing away from the sensor shaft covers the opening in the sensor arm 32, which also cannot be seen here.

In the representations in FIGS. 6 through 10, a longitudinal direction of the sensor arm 32, along which the gliding piece is shiftable, is arranged at a right angle to the vertical plate 36 of the holder 32. It is easy to see in FIG. 6 that the sensor arm 32 is closed on the top.

FIG. 7 shows a cross-section, which is guided below an upper wall of the sensor arm 32 in a horizontal plane. In this view, the sensor shaft 54 leveled on one side, which is inserted into a bore hole with a complementary cross-section in the sensor arm 32, can be seen on the end of the sensor aim 32 facing the sensor 28. The sensor arm 32 is thereby connected in a torque-proof manner with the sensor shaft 54. Furthermore, a gate 56 in the shape of a groove with a rectangular cross-section can be seen. A peg 58 of the gliding piece 48 extending into the gate, which has a rectangular cross-section with rounded corners, is in surface-to-surface contact on both sides with the lateral boundary surfaces of the groove. The gliding piece is forcibly guided in the gate 56 on both sides through the cooperative guide surfaces on the gate 56 and the plug 58. The driving pin 34, which engages in a circular-cylindrical opening in the plug 58 of the gliding piece 48, can also be seen. As is also easy to see in FIG. 7, the disk-shaped extension 50 of the gliding piece 48 covers the entire opening 56 of the gate. The disk-shaped extension 50 thereby projects laterally in the longitudinal direction on both ends over the opening in the gate 56 so that the opening in the gate 56 is always covered by the disk-shaped extension 50 even in the case of a shifting of the gliding piece 48 in the gate 56.

FIG. 8 shows the same arrangement in a view from below, also in a partial cross-section, wherein the horizontally arranged sectional plane here is at the height of the disk-shaped extension 50 of the gliding piece 48. It can be seen in particular that the two bars 46 of the sensor aim 32 encompass the disk-shaped extension 50 of the gliding piece 48 on both sides.

As can be seen in FIGS. 7 and 8, the gate 56 is arranged in a longitudinal direction of the sensor arm 32, wherein a straight line, on which the gliding piece 48 can be moved, runs past the sensor shaft 54 on the side at a certain distance. As is easy to see in particular in FIG. 8, this arrangement enables a size of the disk-shaped extension 50 of the gliding piece 48 sufficient to completely cover the gate 56 and simultaneously a small separation distance between the gliding piece and the sensor shaft, wherein a movement of a part of the gliding piece past the sensor shaft 54 can take place.

In particular, the vertically arranged driving pin 34 can be seen in the side view in FIG. 9, just like the spherical-segment-shaped contact surface 44 of the sensor arm 32, which is contact with the flap 42 of the holder 32.

This can also be seen in FIG. 10, which also permits the identification of the engagement of the driving pin 34 from below into the bore hole 60 in the gliding piece 48. The bore hole 60 extends through the disk-shaped extension 50 and into the plug 58 of the gliding piece 48.

FIG. 11 shows the sensor arm 32. In the upper area, the sensor arm 32 has an almost even width, wherein the progression is slightly angled with respect to the longitudinal direction of the sensor arm 32 in the center. The straight-line section of the sensor arm 32 removed from the bore hole 62 for the sensor shaft is thereby arranged on a straight line distanced laterally from the sensor shaft 54. The gate 56 seen in FIG. 12, which is formed by a groove that is sealed on the top, also runs along this straight line.

FIG. 13 shows the sensor arm 32 from below, wherein in particular the lateral distance from the gate 56 to the pivot point of the sensor shaft 54, which is indicated by a cross, becomes identifiable, just like the lateral distance between the surfaces bordering the gate 56 and the two bars 46 running parallel to it.

FIG. 14 shows in particular the arrangement of the contact surface 44 on a bottom side of the sensor aim.

FIGS. 15 through 18 show the gliding piece in different views. The disk-shaped extension 50 and the plug 58 projecting upwards from the center of it are easy to see.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A drive and steering apparatus for an industrial truck with a drive wheel (10), which is rotatably suspended in a drive wheel suspension (12), which is swivel-mounted around a mainly vertical axis, a steering device, which has a handlebar and a bearing component (20), which is swivel-mounted coaxially or axially parallel to the drive wheel suspension (12), and a steering wheel control device, which has at least one sensor (28), which is arranged in a permanent position with respect to the drive wheel suspension (12) or the bearing component (20) and captures a differential angle between the drive wheel suspension (12) and the bearing component (20), and a steering drive, with which the drive wheel suspension (12) is pivotable as required by the measured differential angle, wherein an elongated sensor arm (32) is connected in a torque-proof manner with a sensor shaft (54) of the at least one sensor (28) and has a longitudinal axis and a free end facing away from the sensor shaft (54), and a counter piece, which is arranged in a permanent position with respect to the bearing component (20) or, respectively with respect to the drive wheel suspension (12), works together with the sensor arm (32) such that the sensor arm (32) with the sensor shaft (54) is rotated during a relative movement between the bearing component (20) and the drive wheel suspension (20).

2. The drive and steering apparatus according to claim 1, characterized in that the counter piece and the sensor arm (32) have guide means, which prevent a displacement of the counter piece with respect to the sensor arm (32) in the tangential direction with respect to the sensor shaft (54).

3. The drive and steering apparatus according to claim 1, characterized in that the sensor arm (32) and the counter piece each have at least one gliding surface, wherein the at least one gliding surface of the sensor arm (32) is in surface-to-surface contact with the at least one gliding surface of the counter piece.

4. The drive and steering apparatus according to claim 2, characterized in that the guide means have a driving pin (34) and a gate (56), wherein the driving pin (34) in the gate (56) is forcibly guided on both sides.

5. The drive and steering apparatus according to claim 4, characterized in that the driving pin (34) is rotatably mounted in a gliding piece (48).

6. The drive and steering apparatus according to claim 4, characterized in that the gate (56) has a groove that is closed on one side, into which the driving pin (34) and/or the gliding piece (48) engages on the open side.

7. The drive and steering apparatus according to claim 5, characterized in that the gliding piece (48) has an extension (50), which is arranged orthogonally to the driving pin (34) and covers an opening in the gate (56), into which the driving pin (34) and/or the gliding piece (48) engages.

8. The drive and steering apparatus according to claim 7, characterized in that the extension (50) is enclosed laterally by bars (46) on the guide means having the gate (56).

9. The drive and steering apparatus according to claim 1, characterized in that the counter piece is shiftable with respect to the sensor arm (32) along a straight line, which runs at a lateral distance from the sensor shaft (32).

10. The drive and steering apparatus according to claim 1, characterized in that the sensor arm (32) is slid onto the sensor shaft (54) and is safeguarded from slipping off the sensor shaft (54) by a boundary surface permanently arranged with respect to the sensor (28).

11. The drive and steering apparatus according to claim 10, characterized in that the sensor arm (32) has a contact surface (44) on its rotational axis, which rests against the boundary surface.

12. The drive and steering apparatus according to claim 1, characterized in that the potential differential angle between the drive wheel suspension (12) and the bearing component (20) is restricted by at least one stop such that a maximum permissible movement of the counter piece with respect to the sensor (28) is not exceeded.

13. A drive and steering apparatus for an industrial truck with a drive wheel (10), which is rotatably suspended in a drive wheel suspension (12), which is swivel-mounted around a mainly vertical axis, a steering device, which has a handlebar and a bearing component (20), which is swivel-mounted coaxially or axially parallel to the drive wheel suspension (12), and a steering wheel control device, which has at least one sensor (28), which measures a differential angle between the drive wheel suspension (12) and the bearing component (20), and has a steering drive, with which the drive wheel suspension (12) is pivotable as required by the measured differential angle, wherein the at least one sensor (28) is arranged in a permanent position with respect to the drive wheel suspension (12), so that no relative movement takes place between the sensor (28) and the drive wheel suspension (12).

14. The drive and steering apparatus according to claim 13, characterized in that the sensor (28) measures the differential angle without contact.

15. The drive and steering apparatus according to claim 13, characterized by a sensor arm (32), which is connected in a torque-proof manner with a sensor shaft (54) of the sensor (28), and a counter piece, which is permanently arranged with respect to the bearing component (20) and works together with the sensor arm (32) such that the sensor arm (32) with the sensor shaft (54) is rotated between the bearing component (20) and the drive wheel suspension (12) in the case of a relative movement.

* * * * *

UNITED STATES PATENT AND TRADEMARK OFFICE
CERTIFICATE OF CORRECTION

PATENT NO. : 8,662,234 B2  
APPLICATION NO. : 12/872593  
DATED : March 4, 2014  
INVENTOR(S) : Matthias Roeder Page 1 of 1

It is certified that error appears in the above-identified patent and that said Letters Patent is hereby corrected as shown below:

On the Title Page

(73) Assignee:, delete "Akteingesellschaft" and insert --Aktiengesellschaft--

Signed and Sealed this
Eleventh Day of November, 2014

Michelle K. Lee
*Deputy Director of the United States Patent and Trademark Office*